United States Patent [19]

Casacci

[11] Patent Number: 4,922,862
[45] Date of Patent: May 8, 1990

[54] SYSTEM FOR SUPPLYING DIFFERENT FUELS TO OTTO ENGINES WITH ELECTRONIC FUEL-INJECTION

[75] Inventor: Carlo Casacci, Bologna, Italy
[73] Assignee: Sprint Auto S.p.A., Bologna, Italy
[21] Appl. No.: 276,628
[22] Filed: Nov. 28, 1988

[30] Foreign Application Priority Data

Dec. 28, 1987 [IT] Italy ................................. 3744 A/87

[51] Int. Cl.$^5$ .................... F02D 19/06; F02M 37/00; F02P 5/04
[52] U.S. Cl. .................................. 123/1 A; 123/406; 123/478; 123/575
[58] Field of Search ................ 123/1 A, 27 GE, 478, 123/525, 526, 575–578, 406

[56] References Cited

U.S. PATENT DOCUMENTS

| | | | |
|---|---|---|---|
| 4,306,532 | 12/1981 | Camacho | 123/525 X |
| 4,399,780 | 8/1983 | Lassanske et al. | 123/406 X |
| 4,430,978 | 2/1984 | Lewis et al. | 123/527 X |
| 4,495,930 | 1/1985 | Nakajima | 123/575 |
| 4,703,732 | 11/1987 | Wineland et al. | 123/1 A X |

FOREIGN PATENT DOCUMENTS

| | | |
|---|---|---|
| 0066327 | 12/1982 | European Pat. Off. . |
| 0084219 | 7/1983 | European Pat. Off. . |
| 0157511 | 10/1985 | European Pat. Off. . |
| 3233935 | 3/1984 | Fed. Rep. of Germany ...... 123/575 |
| 20527 | 2/1982 | Japan .................................. 123/575 |
| 27834 | 2/1983 | Japan .................................. 123/575 |
| 03120 | 9/1983 | PCT Int'l Appl. ................ 123/525 |

Primary Examiner—Tony M. Argenbright
Attorney, Agent, or Firm—Stevens, Davis, Miller & Mosher

[57] ABSTRACT

The system for supplying different fuels to Otto engines with electronic fuel-injection comprises a tank containing liquid gas under pressure, a pumping unit that delivers the liquid gas to an injection nozzle that is also used for the injection of petrol. A signal multiplier, modifies the parameters fixed by an electronic control box that controls the injection nozzle and the spark plug while a switch selects in turn the supplying of petrol or of liquid gas.

2 Claims, 1 Drawing Sheet

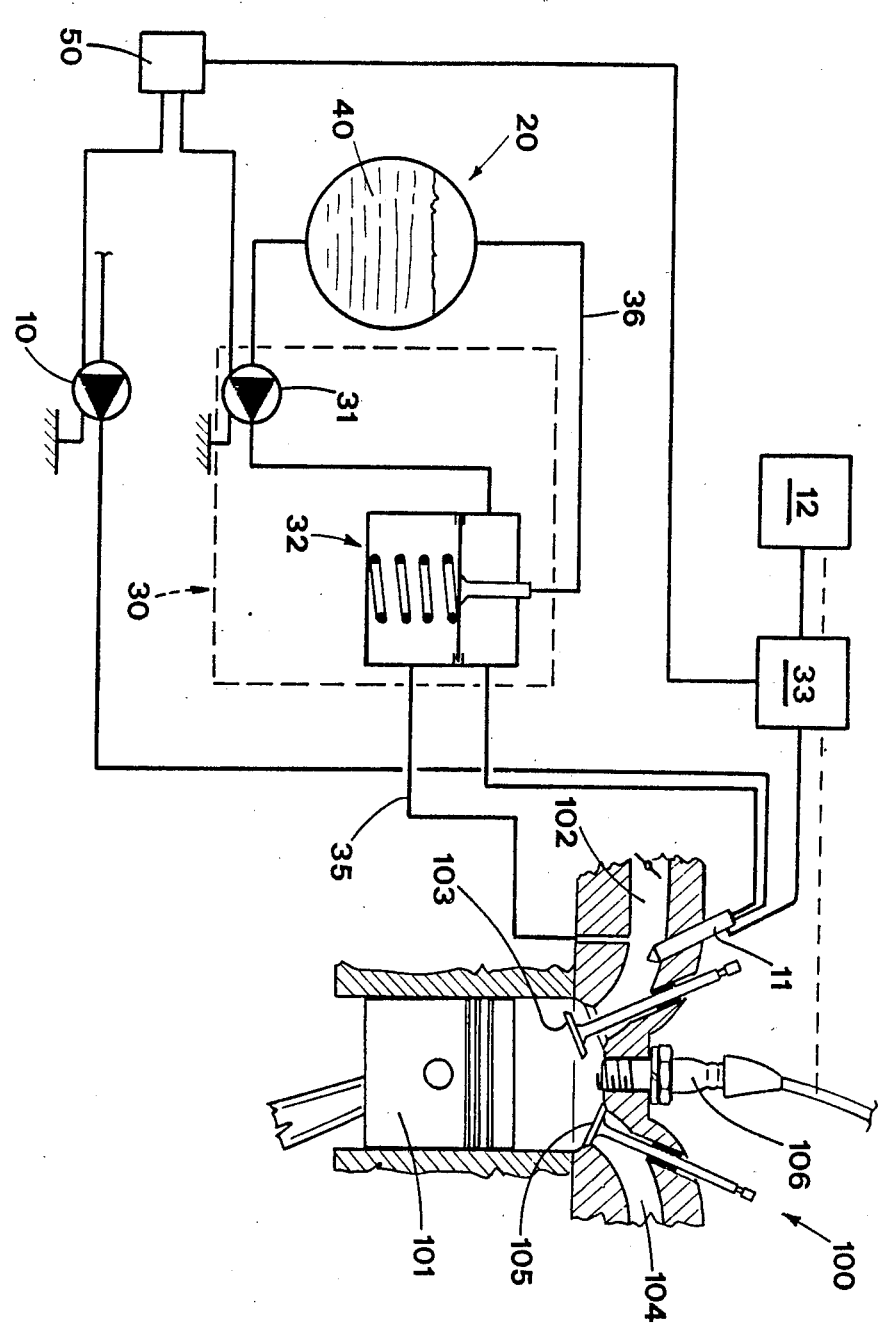

SYSTEM FOR SUPPLYING DIFFERENT FUELS TO OTTO ENGINES WITH ELECTRONIC FUEL-INJECTION

BACKGROUND OF THE INVENTION

This invention relates to the technical sector specifically concerned with systems for running Otto engines on different types of fuel, and particularly relates to a system, for supplying different fuels to Otto engines with electronic fuel-injection.

DESCRIPTION OF THE PRIOR ART

Known systems are quite widespread, especially in Italy, and are also favored by the heavy taxes on petrol or gasoline; among other things, there is a saving in fuel costs although performance is slightly penalized.

The most widespread so-called alternative fuels are LPG (liquid petroleum gas) and CNG (compressed natural gas): the systems for supplying engines with these fuels are basically similar, with the exception of the storage unit, which in the case of CNG requires a much higher pressure to store a sufficient quantity of fuel.

In standard cars with engines fed by one or more carburetors, the systems designed to supply these engines with different fuels consist mainly of a tank, a pressure reducer with its associated vaporizer (the so-called plenum chamber) as well as one or more choke valves, placed at the entrance to the carburetor Venturi tube, where the depression generated by the piston creates the condition for the formation of the explosive air-gas mixture in the same way as the air-petrol mixture is formed in the carburetor.

The titre of the above-mentioned mixture is considerably affected by variations in numerous parameters e.g.: the number of engine revolutions, position of the throttle valve in the inlet pipe, external pressure and temperature, etc.

Titre variations lead to increased consumption, bad combustion and therefore greater pollution, as well as giving rise to various functioning and performance problems.

These can be overcome, or at least reduced, by using fuel-injection systems (either single-point or multi-point) which are not new, but have become extremely interesting since, with the progress in electronics, it has become possible to create, at a reasonable cost, fuel-injection systems with a complete electronic control.

In these systems an electronic control box processes a mass of information, collected by appropriate sensors, it compares the data with that stored in its memories and, in real time, enables fuel supply and ignition thus optimizing engine performance under all conditions.

Moreover, it should be noted that the number of fuel-injection engines is bound to increase considerably since they are ideally suited for the fitting of catalytic silencers, which, at the present state of technology, represent probably the only way of conforming with the strict anti-pollution regulations which can be expected on a wide scale in the near future.

It is obvious that if a conventional system for supplying different fuels is fitted to a car of the latest generation this means sacrificing, at the very least, all the advantages which car and electronic technology have offered in recent years.

It is also a good idea to examine the reasons why engine performance is penalized by conventional systems; in fact, besides the lower calorific power and lower specific weight of LPG or CNG as compared to petrol, a reduction in volumetric efficiency is inevitable with these systems since the mixture consists of air with LPG or CNG in its gaseous state; as well as this there is also a slight, inevitable, reduction in engine performance even when running on petrol since the diameter of the gas choke tube is generally less than that of the carburetor duct, thus strangling the air flow.

Added to all this, there is the fact that the optimum spark advance varies according to the fuel used, in particular for CNG which requires a considerable advance and this is obviously incompatible with correct functioning with petrol.

SUMMARY OF THE INVENTION

The aim of the present invention is to provide a system, for supplying different fuels to Otto engines with electronic fuel-injection, capable of using the same injection nozzle and the same electronic control box as the original system to supply liquid gas to the inlet pipe of the said engine and capable of adopting the same parameters, suitably adjusted, used by the electronic control box of the original system to enable fuel-supply and ignition of the said engine.

Another aim of this invention is to offer a fuel-control system which, when the engine is running on petrol, maintains all the original functioning conditions with no reduction whatsoever.

The aims mentioned above, are achieved by a system, for supplying different fuels to Otto engines with electronic fuel-injection comprising: a primary tank containing petrol; a primary fuel supply pump designed to send said petrol to at least one injection nozzle, situated on an inlet duct, upstream of a relative valve; an electronic control box, designed to control the enabling of the said injection nozzle in accordance with preset supply parameters; the said system being characterized in that it comprises: a second tank containing liquid gas under pressure; a pumping unit designed to deliver said liquid gas to the said injection nozzle; a switch for the enabling, in turn, of the said primary fuel supply pump or of the said pumping unit; a signal multiplier, located between the said injection nozzle and the said control box, the said multiplier being actuated by the said switch when the said pumping unit is actuated and designed to intervene to modify the said supply parameters in accordance with a constant correction value.

BRIEF DESCRIPTION OF THE DRAWING

The characteristic of the invention not have emerged above are emphasised hereinafter with specific reference to the attached drawing, particularly to the only FIGURE in which the system forming the subject of the present invention is schematically shown.

DESCRIPTION OF THE PREFERRED EMBODIMENT

The system is designed for controlling the supply of different fuels to an engine 100 (Otto engine), a cross-section of which is shown with the parts removed.

The parts of this engine indicated are the piston 101, the inlet duct 102, with its relative valve 103, an exhaust duct 104, with its relative valve 105 and a spark plug 106.

The cycle phase illustrated is the depression one, with the piston 101 moving towards the bottom dead center and the inlet valve 103 open.

The motor 100 was originally provided with means for the electronic fuel-injection of petrol.

These means comprise the following parts: a primary tank (not illustrated) containing petrol; a primary fuel supply pump (not illustrated) to guarantee a correct flow of petrol from the tank to an injection pump 10, from where the petrol is sent to an injection nozzle 11, situated on the inlet duct 102, upstream of the relative valve 103.

The supply parameters governing the enabling of the injection nozzle 11, i.e. the duration of the injection and therefore the quantity of petrol injected, are controlled throughout all the phases by an electronic control box 12, which processes relevant characteristic data collected by appropriate sensors (not illustrated) and compares them with those stored in its memory, in relation to the power required from the engine minute by minute.

The electronic control box illustrated is a type, widely adopted, which also controls the parameters enabling spark-plug 106 ignition.

The system under examination consists of a second tank 20 containing liquid gas 40 under pressure to supply the engine 100.

The gas considered in the example described is that known as LPG.

Instead of petrol, liquid gas 40 is drawn by a pumping unit 30 and delivered, still in its liquid state, to the said injection nozzle 11 when selected by means of the switch 50.

This switch 50, according to its position, enables the said injection pump 10 or the pumping unit 30.

Basically the pumping unit 30 consists of a second supply pump 31 and a pressure regulator 32, of a known type, which guarantees the correct flow of liquid gas 40 to the injection nozzle 11.

The pressure regulator 32 has two pipes 35 and 36; by means of the first the depression in the said inlet duct 102 is exploited for the functioning of the same regulator, the second pipe permits the return of surplus liquid gas 40 from the pumping unit 30 to the tank 20.

It should be underlined that the pumping unit 30 guarantees an injection pressure which is much higher than that necessary for petrol injection, to form an air-liquid gas mixture in which a greater part of the latter is present in vapor form, as occurs with petrol.

Translating the above into figures, to give a general idea, it can be calculated that liquid gas 40 is injected with a pressure close to 20 bar, against 4-5 bar for petrol injection.

The switch 50, mentioned previously, turned to the position where it enables the pumping unit 30, also enables a signal multiplier 33, downstream (cascade connection) of the said electronic control box 12.

The multiplier 33, inoperative and by-passed when petrol injection is selected, intervenes to modify the signal leaving the control box 12 and directed towards the injection nozzle 11, adjusting the above-mentioned supply parameters to those required for liquid gas supply.

The same multiplier 33 can also modify the ignition parameters according to which the said spark plug 106 is enabled.

In practice, considering the special features of the control box 12, already mentioned above, the signal multiplier 33 intervenes to modify the duration of injection according to a constant value, to control the quantity, in weight, of gas injected and to advance, according to a value in constant degrees, (fixed advance) the moment at which the spark plug 106 is ignited, to ensure optimum combustion of the air-gas mixture.

It is easy to see from the above description that the original aims have been fully achieved; in particular the system created with this invention provides a high overall efficiency of the engine 100 running on liquid gas: compared to a conventional system, this efficiency can reasonably be considered to be increased by the same degree of efficiency improvement as that recorded for the engine 100 with the change-over from the carburetor to electronic fuel-injection.

Moreover, the presence of the system has no effect on the performance when running on petrol, since the functioning conditions of the engine 100 remain the same as those originally designed.

A further advantage of this system, not to be ignored, is the small number of components which can easily be installed without any radical, expensive or irreversible changes to the parts already fitted.

It is to be understood that the description supplied herein is solely an unlimited example and not binding, such that possible variations in the construction details (using CNG or other liquid fuels, for example) wil not effect the protective framework afforded to the invention, as described above and claimed hereinafter.

What is claimed is:

1. A system, for supplying different fuels to Otto engines with electronic fuel-injection comprising: a primary fuel supply pump designed to send petrol to at least one injection nozzle, situated on an inlet duct, upstream of a valve; an electronic control box, designed to control the enabling of said injection nozzle in accordance with preset supply parameters; a tank containing liquid gas under pressure; a pumping unit designed to deliver said liquid gas to said injection nozzle; a switch for the enabling, in turn, of said primary fuel supply pump or of said pumping unit; a signal multiplier, located between said injection nozzle and said control box, said multiplier being actuated by said switch, when said pumping unit is actuated, and designed to intervene to modify said supply parameters in accordance with a constant correction value.

2. A system as in claim 1, wherein said signal multiplier is further designed to modify the ignition parameters fixed by said electronic control box for the enabling of a spark plug.

* * * * *